United States Patent [19]
Parfree et al.

[11] Patent Number: 4,767,182
[45] Date of Patent: Aug. 30, 1988

[54] SUBMARINE CABLE

[75] Inventors: Colin S. Parfree, Southampton; Colin F. G. Smith, Winchester; Peter Worthington; Malcolm G. Marten, both of Southampton; Norman S. Bliss, East Wellow. Nr Romsey, all of England

[73] Assignee: Standard Telephones & Cables, Public Limited Company, London, England

[21] Appl. No.: 133,219

[22] Filed: Dec. 14, 1987

Related U.S. Application Data

[63] Continuation of Ser. No. 701,690, Feb. 14, 1985, abandoned.

[30] Foreign Application Priority Data

Feb. 16, 1984 [GB] United Kingdom ............... 8404083
Sep. 22, 1984 [GB] United Kingdom ............... 8424044

[51] Int. Cl.$^4$ .............................................. G02B 6/44
[52] U.S. Cl. ................................................. 350/96.23
[58] Field of Search ..................................... 350/96.23

[56] References Cited

FOREIGN PATENT DOCUMENTS 0032761 7/1981 European Pat. Off. .
0088519 9/1983 European Pat. Off. .
2043936 10/1980 United Kingdom .
2052092 1/1981 United Kingdom .
2063502 6/1981 United Kingdom .
2101505 1/1983 United Kingdom .

Primary Examiner—William L. Sikes
Assistant Examiner—Robert E. Wise
Attorney, Agent, or Firm—Kerkam, Stowell, Kondracki & Clarke

[57] ABSTRACT

In an optical fibre submarine cable the ingress of hydrogen ions is reduced if not eliminated by at least one envelope which provides a barrier to hydrogen ions.

In one embodiment a copper tape (L) is folded longitudinally around the cable core comprising strength member wires (G,H) split aluminium or coppr tube (E) and optical fibre package (A). The abutting edges (L') are seam welded with less than 0.1% skips. Preferably the folded copper tape is longitudinally welded while a loose fit and subsequently reduced in diameter to leave an accurately determined small annular gap between tubes E and F which is filled with a water blocking material that is highly viscose at ambient temperature and effectively glues the tubes together.

In an alternative embodiment, or as a modification to the embodiment just described, the aluminium or copper tube (E) has its abutting edges (E') welded to a depth sufficient to provide the envelope (or a second such envelope) but insufficient to cause damage to the optical fibre package (A) through the heat from welding.

12 Claims, 4 Drawing Sheets

4,767,182

SUBMARINE CABLE

This is a continuation of application Ser. No. 701,690, filed Feb. 14, 1985, now abandoned.

FIELD OF THE INVENTION

This invention relates to submarine optical fibre cables.

In 1980 we, in collaboration with British Telecom, laid a first prototype experimental submarine optical fibre cable in Loch Fyne in Scotland and the performance of this cable has been monitored. The structure of the cable is shown in FIG. 1 of the drawing and, referring to that drawing comprises a central optical fibre package A which includes a package strength member A' of high tensile steel wire. Around the package strength member A' are eight single mode secondary coated optical fibres B which are held in the package with the strength member A' by means of a fibre package whipping C. We prefer a fibrous Kevlar ribbon which in the particular embodiment described has about 200 denier.

The fibre package is loosely housed in a tubular metallic core E which in this embodiment is aluminium. The tubular metallic core E has a single split E' whereby the optical fibre package is introduced into the core before the tubular member is closed.

The optical fibre package A and the annular gap between the fibre package and the internal bore D of the tubular member E, are impregnated and filled respectively with a water blocking compound. The main function of this water blocking compound is to substantially restrict longitudinal infiltration of water along the core should the cable become damaged.

Around the tubular core E is applied one layer of tensile strength elements for the cable, G. The layer G comprises twelve high tensile steel wires whose size is chosen in conjunction with the outer diameter of the core E, to be radially supported by the core and to bridge against one another so that in conjunction with the central tubular core E, there is formed a crush-resistant electrically conductive cable core having a tensile strength member which provides the tensile strength the cable is required to have, and also is crush-resistant so that the fibres losely held in the central bore D of the tubular member are substantially free of compressive stresses in use of the cable.

Around the layer of strength member wires G is a copper tape with overlapping edges 'G' welded and which is compacted by drawing onto the strand.

Extruded around the outside of and directly onto the outer layer of strength member wires is a polyethylene sheath J which forms an electrical insulation between the outside and electric power or electric signal which is, in use of the cable, transmitted along the conductive central core E.

An armouring layer K is applied to the outside of the insulation J.

PROBLEM WHICH THE INVENTION IS TO SOLVE

Since monitoring the performance of the cable we have become aware of a change taking place in the transmission loss of the optical fibres at certain wavelengths corresponding generally to impregnation of the fibre by hydrogen atoms. Although the change is slight it appears to be a gradual yet continuous change such that transmission at say 1.3 micron wavelength might eventually be impaired.

Our investigations lead us to believe that the likely source of the hydrogen is probably the armour wires K reacting with the outside water, and from within the cable due to the use of mixed metals, i.e. copper, steel, aluminium, in the presence of an electrolyte.

It is an object of the present invention to provide a cable construction which attempts to overcome this problem while at the same time providing a cost effective manufacturing process.

MEANS OF SOLVING THE PROBLEMS

According to one aspect of the present invention there is provided an optical fibre cable comprising at least one optical fibre housed within a tubular metallic core member of the cable, a tensile strength member for sustaining the tensile loads which will in use be borne by the cable, said core member comprising at least one split tube and welded along the split to a depth in the range $\frac{1}{3}$ to $\frac{2}{3}$ the thickness of the core member whereby to provide an envelope around the fibre which is impermeable to hydrogen relative to the other component parts of the cable.

According to a further aspect of the present invention there is provided an optical fibre cable comprising at least one optical fibre housed within a metallic core member of the cable, a tensile strength member for sustaining the tensile loads which will in use be borne by the cable, the core member comprising a first split metal tube which has been closed around the optical fibres, and a second split metallic tube which has been closed around the first tube, said second tube being welded so as to provide at least one envelope around the fibre (A) which is impermeable to hydrogen, relative to the other component parts of the cable.

According to another aspect of the present invention there is provided a method of making an optical fibre cable, the cable comprising at least one optical fibre housed within a crush-resistant channel in a core member of the cable, and a tensile strength member for sustaining the tensile loads which will in use be borne by the cable, the method including the step of forming around the channel (D) at least one envelope which is rendered impervious to hyrogen relative to the other component parts of the cable by a welding process.

OPERATION OR USAGE

Preferably the metal envelope is closed around the first tube without distorting the first tube.

In one embodiment of the invention the envelope comprises a metallic sheath of copper surrounding the core member and hermetically sealed. Conveniently this can be applied by folding a copper tape longitudinally about the core member and seam-welding the abutting edges of the copper tape to the extent that gaps or skips in the welding occupy less than 0.1 percent of the length of the weld. Preferably the second split metallic tube is formed from a thin copper tape having a thickness in the range 0.3 to 0.4 millimetres, preferably 0.375 mm. Preferably the tape is folded around the first metal tube to form a relatively loose fit therearound and welded along its longitudinal edges. It is then passed through a set of forming rollers or dies which reduce its diameter until it is just touching the first split metal tube, there being a gap between the outside surface of the first metal tube and the inner surface of the second tube in the range 0.025 mm to 0.25 mm. Preferably the first metal tube is longitudinally water blocked with a water blocking material and the annular space between the first tube and the second tube is also longitudinally water blocked with a water blocking material. Preferably this water blocking material has a very high viscosity at ambient working temperatures in the region of $10^7$ cPs or $10^6$ Pa.sec.

In an alternative embodiment, where the core member comprises an extruded 'C' section which is closed around the optical fibre package and is in turn surrounded by the cable strength member element in the form of steel wires, then it is proposed to weld the split in the closed 'C' section to a depth sufficient to provide an effective barrier against hydrogen permeation but insufficient for the heat from welding to cause damage to the underlying optical fibre package. Preferably the depth of the weld is between one third and two thirds of the radial thickness of the split tube. Conveniently the weld is performed by an argon arc and the electrode is maintained in alignment with the split in the closed 'C' section by a thin guide blade located in the gap between the closing edges of the 'C' section, the blade controlling the orientation of the welding apparatus directly or by a servo-control arrangement. Alternatively due to heat transfer to the enclosed optical fibres, electron beam or high frequency welding may be preferred.

As an alternative embodiment it would be possible to combine the addition of the copper tape with welding the closed 'C' section tube to give a double barrier against hydrogen permeation.

In a further improvement where the strength member comprises steel wires in or around the core member, it is proposed to impregnate the interstices of the wires with a gas and water blocking filling material e.g. silicone rubber.

EMBODIMENTS

In order that the invention can be clearly understood reference will now be made to the accompanying drawings in which.

Figure 1:
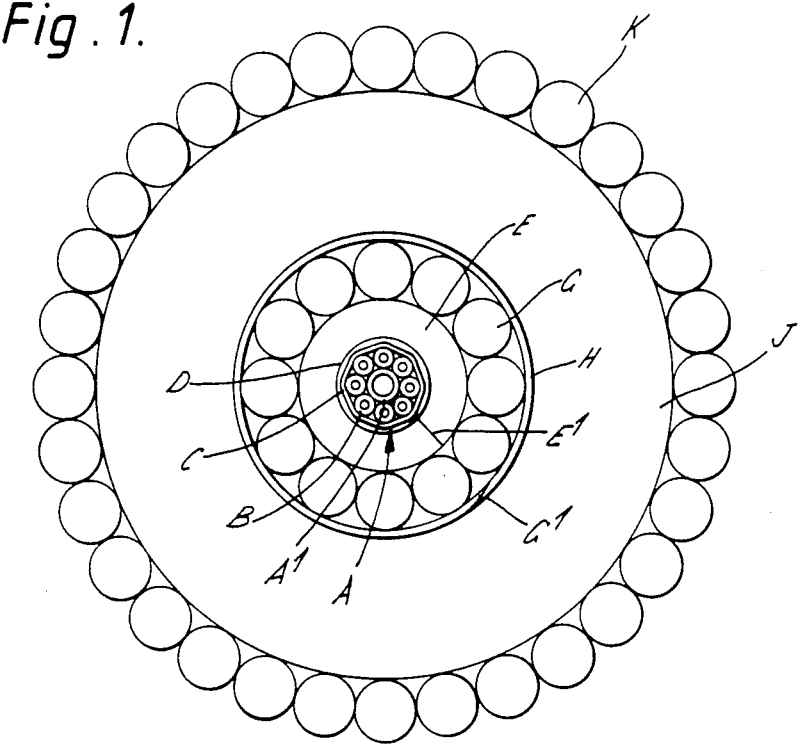
FIG. 1 shows an optical fibre submarine cable similar to the experimental cable laid in Loch Fyne.
Figure 2:
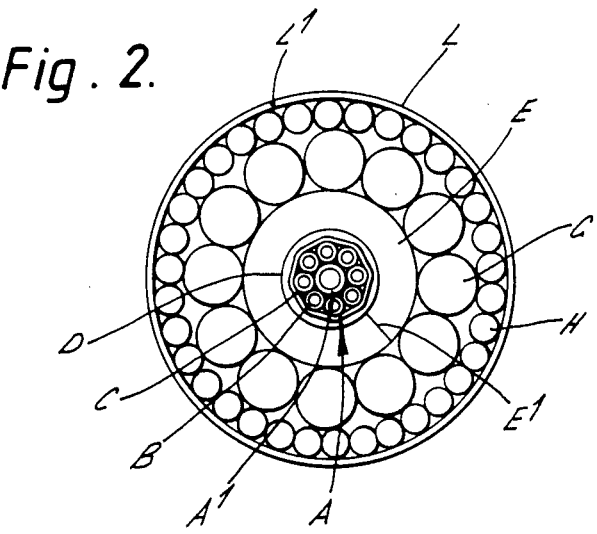
FIG. 2 shows the core of an optical fibre submarine cable according to one embodiment of the invention.

Referring to FIG. 2 the same reference numerals as FIG. 1 are used to designate similar parts of the cable. Only the cable core is shown including the strength member wires. Prior to extruding the polythene dielectric over the core, a copper tape L is formed around the strength member and has abutting edges L' which are seam welded such that there are no gaps or skips or at least less than 0.1 percent over the length of the core.

Prior to forming the tape around the core, the interstices of the strength member are filled with a water and gas blocking compound e.g. a silicone rubber which is relatively impermeable to hydrogen.

Figure 3:
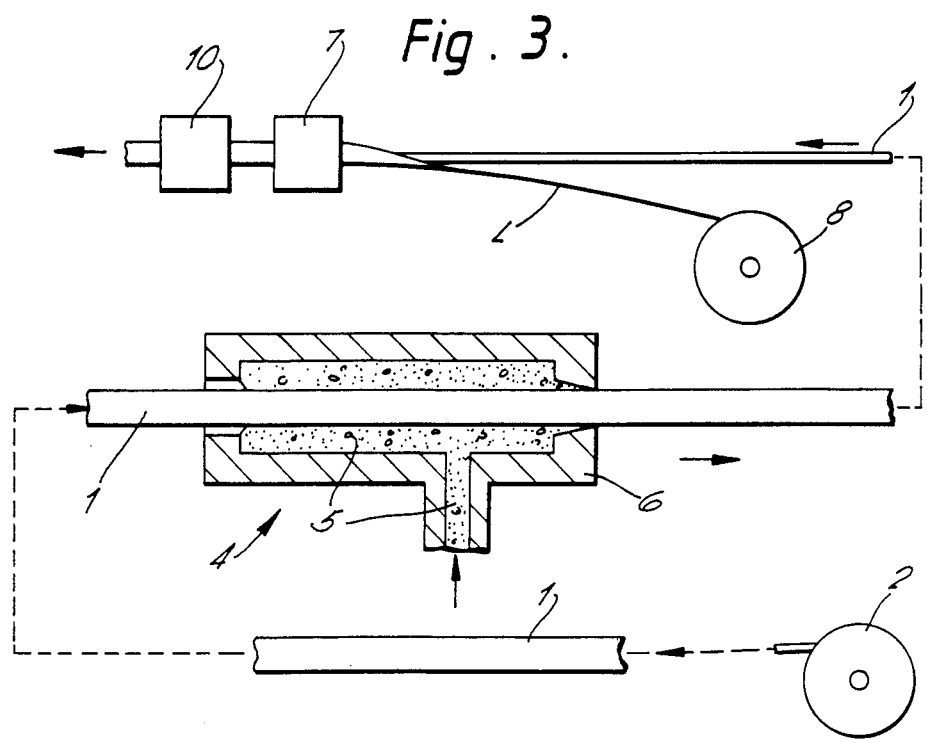
FIG. 3 shows the manufacture of the core of FIG. 2.

The apparatus for carrying out these operations is illustrated in FIG. 3. Referring to FIG. 3 the cable core as shown in FIG. 2 but without the copper tape and designated generally by the reference numeral 1 is fed either directly from a stranding machine or as illustrated from a cable drum 2, on which it has been stored following the strength member stranding operation. The core is drawn from the drum through an impregnating station 4 where a gas and water blocking compound 5 such as silicone rubber is forced by a positive displacement pump into an extruding head and die block assembly 6. The interstices of the wires G and H become impregnated and coated with the compound, the temperature of the head 16 and the pressure of extrusion are adjusted so that complete impregnation is achieved.

The coated and impregnated core 1 proceeds to the next station 7 where it enters a folding copper tape L which is drawn from a storage drum 8. The station 7 comprises a series of closure rollers which act to fold the tape around the core.

Figure 4:
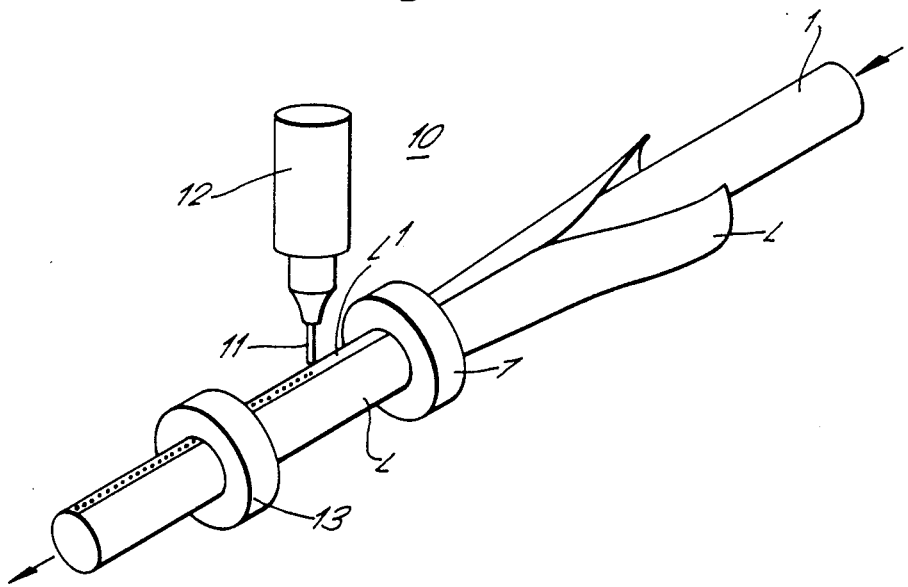
FIG. 4 shows in more detail part of FIG. 3.

Just beyond station 7 is a welding station 10 and this is shown schematically in FIG. 4. Referring to FIG. 4 an argon arc welding station comprises an electrode 11 of an arc welding torch 12 which is held stationary in the welding position close to the final rollers or die of station 7. As the core 1 and the copper tape L of the cable are drawn through the welding station, the abutting edges L' are seam welded together. Following the welding operation the copper tube formed from the tape is drawn down through a sizing die 13 so that the tube is a tight fit around the strength member wires H.

Following the die 13 the weld is tested by eddy current or ultrasonic equipment to check that less than 0.1% skips or gaps are present.

The copper tape L provide an effective barrier to permeation of hydrogen atoms from outside the cable core. In addition or instead of these measures, it is also proposed to seal the aluminium or copper tube E by welding the abutting edges E'. This is illustrated in FIG. 5.

Figure 5:
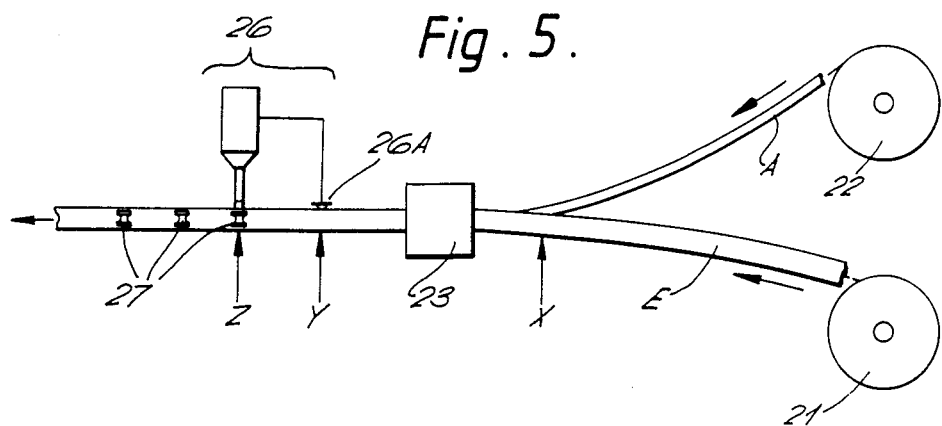
FIG. 5 shows another part of the manufacturing process for welding the tube of FIG. 2.
Figure 8:
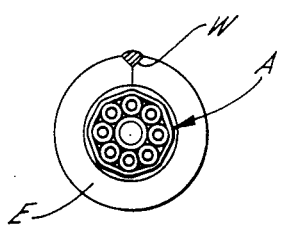
FIGS. 6, 7 and 8 show stages in the process of closing tube E of FIG. 5.
Figure 7:
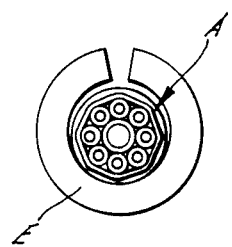
Figure 6:
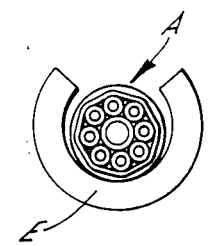
Figure 9:
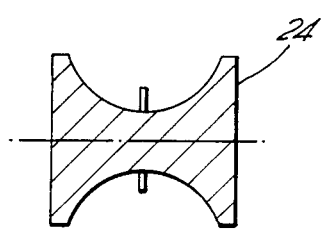
FIG. 9 shows part of the appartus of FIG. 5.

Referring to FIG. 5 the 'C' section E is drawn from a drum 21 (it could instead be folded up from flat tape) and the optical fibre package A is simultaneously drawn from a drum 22. The thickness of the tube E is at least 20 thou, preferably 45 thou, but could be thicker. In the preferred embodiment the external diameter of the tube E is 0.24 inches. The width of the longitudinally-extending gap between edges of the 'C' section E is just large enough to allow the optical fibre package A to enter the tube and the arrangement at the location X in FIG. 5 is shown in FIG. 6 in cross section. The tube E then enters a closing die or set of rollers at station 23 which almost closes the tube as shown in FIG. 7. One of the top rollers 24 is shown in FIG. 9 and this roller has a horizontal axis and a central fin 25 which fits in the closing gap between the edges of the tube E so as to maintain the gap or seam to be welded in line with the welding apparatus 26 immediately following the station 23. At location Y the arrangement is as shown in FIG. 7, but at location Z the seam W is welded and sideways pressure is averted by rollers such as 27 so as to upset the weld W and ensure the now abutting edges are pressed together during welding. FIG. 8 shows the arrangement at the location Z and beyond.

Various types of welding apparatus 26 may be used such as TIG welding using a non-consumable electrode (gas tungsten arc welding), electron beam welding, high frequency welding, laser welding, plasma arc welding. Due to heat transfer to the enclosed optical fibres electron beam welding or H.F. welding is preferred.

Instead of using the finned roller such as is shown in FIG. 9, to maintain the tube seam in a fixed alignment, a separate fin fixed to the apparatus at the station 23 could be used for the same purpose.

It would also be possible to use a seam following device indicated by reference numeral 26A in FIG. 5 which senses the seam and moves the welding apparatus or beam sideways to compensate for any sideways drift of the seam caused by the tube twisting slightly during the closing process. This could be used as well as, or in place of, the fixed seam locating technique described above. An advantage of H.F. welding is its comparative insensitivity to seam wander.

In the embodiments described the thickness of the copper tape L is 45 thou. It could, however, lie anywhere in the range 20 to 70 thou.

The 'C' section tube can be of aluminium instead of copper. As an alternative form of construction shown in FIG. 10 it is proposed to use a thin section of aluminium or copper (e.g. between 15 to 55 thou thick) which, after closure to form a first tube E', is surrounded by a similar metal tube E which is longitudinally seam welded W' along the abutting edges and compacted around the inner closed section. In the preferred embodiment the inner tube thickness would be 31.5 thou and the outer thickness 15 thou. To provide an effective hydrogen barrier the welded seam must have low porosity and a skip length summation less than 0.1% of the total length. This applies to welding the tube E, the outer tube E" (FIG. 10) and the tape weld L'.

Figure 10:
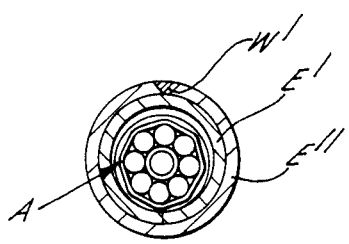
FIG. 10 shows an alternative embodiment in which the single tube E is replaced by a double tube E' and E''.
Figure 11A:
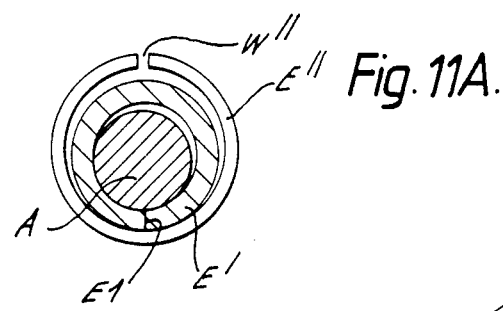
FIGS. 11A, 11B and 11C depict an improvement over FIG. 10 and show various stages in the formation of the hollow metallic core housing the optical fibre of the cable, and, FIG. 12 shows block schematically the steps in the manfacturing process for the cable of FIG. 11.
Figure 11B:
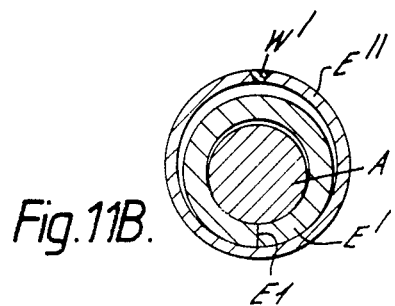
Figure 11C:
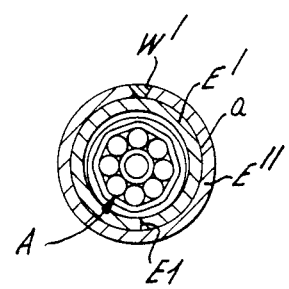
Figure 12:
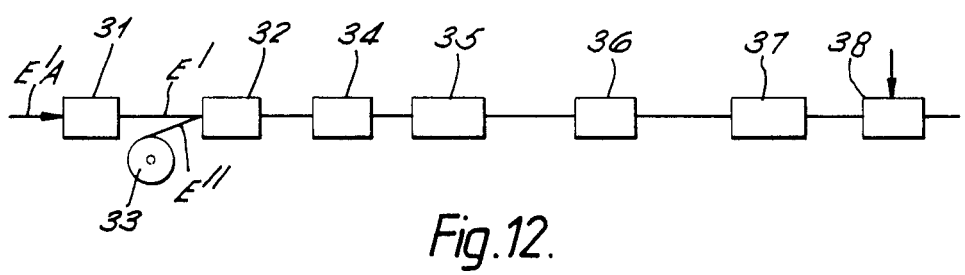

Referring to FIGS. 11 and 12, a modification of the FIG. 10 arrangement is shown. The optical fibre package A is inserted into the hollow C-section copper extrusion E' through the slot in the C-section, and the C-section is closed at station 31 in FIG. 12 by a closing roller and die arrangement. At station 31 a water blocking material such as polybutene (e.g. Hyvis 2000-RTM) is pumped into the C-section prior to closure.

The closed copper extrusion E then proceeds to station 32 where a flat copper tape E" is drawn from a bobbin 33 and folded around the section E so that its abutting edges W'" leave the tape E" a loose fit around the section E' as shown in FIG. 11A.

The assembly then proceeds to station 34 where the abutting edges W'" of the tape E" are welded together at W' as shown in FIG. 11B. Here the tape E" is still a loose fit around the section E'.

At station 35 a set of rollers very accurately reduces the diameter of the closed tape E" until there is a small predetermined annular gap a FIG. 11C between E" and E' in the range 0.025 mm to 0.25 mm. It is preferably of the order of 0.025 mm to 0.05 mm. This gap a is arranged to be just large enough to be filled by the "smear" of water blocking compound which exists on the outside of tube E . This is carefully controlled because if there is too much water blocking compound then the tube E" may burst with the pressure and, in the alternative, if there is too little compound then there will be an air gap between the two tubes which would allow water penetration, and this is undesirable. Thus, FIG. 11C shows the completed hollow core member with tubes E' and E" having the 0.025 or 0.05 mm radial gap (a) indicated by the circular line inferface between E" and E' formed at station 35.

From there the core housing the optical fibre package is further processed to receive a first layer G of strength elements at station 36 and a second layer H of strength members at station 37.

Such a produce comprising just the hollow core member with the optical fibre package longitudinally water blocked and surrounded by a tensile strength member can provide an overhead earth conductor through which telecommunications signals can be passed via the optical fibres, while at the same time the cable acts as an aerial earth conductor for an overhead transmission system. In such a case, at least some of the high tensile wires would need to be replaced with highly conductive wires such as aluminium alloy and our British patent No. 202904A discloses arrangements suitable as an aerial earth conductor. The tubular core 11 of that patent could be replaced by the core structure shown in FIG. 11C and made according to the embodiment of the present invention.

For a submarine cable, however, a dielectric material is necessary and this is illustrated in FIG. 1 by the reference numeral J. For the submarine cable then the core arrangement of FIG. 11C together with its strength member layers G and H proceeds to station 38 where it receives an extruded polyethylene jacket which acts as a dielectric insulator between the central core and the outer environment. For example, a submarine cable link has to provide a DC operating voltage to power the submarine repeaters, and the voltage of the internal core structure may be as high as 10K volts.

For deep water applications, the polyethylene insulation can be left unarmoured, but for shallow water applications where fishing is prevalent and damage from anchors and the like can occur, then an armouring layer K (FIG. 1) is applied using conventional armouring techniques or as described for example in our British patent No. 1595513.

TECHNICAL ADVANTAGES

The invention provides a simple yet effective answer to the possible problems of hydrogen in submarine cables. The invention discovers the possible problems and suggests not to prevent the generation of hydrogen but rather to accept it and to prevent the hydrogen reaching the optical fibres. The advantage is the ability to provide a technically good solution with minimal expense and at the same time preserving as far as possible the good proven points of existing submarine cable design.

We claim:
1. An optical fibre cable comprising at least one optical fibre housed within a metallic core member of the cable, the core member comprising a first split metallic tube which has been closed around the optical fibres, and a second split metallic tube which has been closed around the first tube, which second tube is welded to provide an envelope around the fibre which is impermeable to hydrogen relative to other component parts of the cable, there being a small annular gap between the first and second tubes, which gap is filled with a water blocking material, and comprising a tensile strength member surrounding the welded second tube for sustaining the tensile loads which will in use be borne by the cable.

2. A cable as claimed in claim 1 comprising a metal tape surrounding the tensile strength member and having abutting edges welded so as to provide a second envelope around the fibre which is relatively impermeable to hydrogen.

3. A cable as claimed in claim 2, wherein the metal tape has a thickness in the range 10 to 20 thousandths of an inch.

4. A cable as claimed in claim 2, comprising a tubular dielectric body extruded over the second envelope.

5. A claim as claimed in claim 1, wherein interstices within the cable are filled with a gas and water blocking filling material.

6. An optical fibre cable as claimed in claim 1, wherein the annular gap lies in the range 0.025 to to 0.25 mm.

7. An optical fibre cable as claimed in claim 1, wherein the second split metallic tube is of copper.

8. A method of making an optical fibre cable, the cable comprising at least one optical fibre housed within a crush-resistant channel in a tubular metallic core member of the cable, and a tensile strength member for sustaining the tensile loads which will in use be borne by the cable, the method including the steps of: closing a first split metallic tube around the at least one optical fibre, closing a second split metallic tube around the closed first split metallic tube by moving the closed first split metallic tube and an elongate metal strip in the same longitudinal direction through a folding station, a welding station and a sizing station, folding the metal strip around the closed first split metallic tube in the folding station so that the edges of the strip are brought together to form the closed second split metallic tube, forming an envelope imperious to hydrogen relative to the other component parts of the cable by welding the edges of the strip forming the closed second split metallic tube together in the welding station, reducing the size of the envelope in the sizing station such that the closed first split metallic tube and the envelope define between them a small annular space, the annular space being filled with a water blocking material, the closed first split metallic tube and the sized envelope comprising the tubular metallic core member, and subsequently applying the tensile strength member over the sized envelope.

9. A method as claimed in claim 8, wherein the envelope is formed from a longitudinally-applied copper tape.

10. A method as claimed in claim 8 wherein the core member and the envelope define between them a small annular space said method comprising the further step of longitudinally water blocking the space with a water blocking material which has a high viscosity at ambient temperature such as to effectively glue the envelope to the core member.

11. A method as claimed in claim 10, wherein the envelope is formed of copper having a thickness in the range 0.3 mm to 0.4 mm.

12. A method as claimed in claim 10, wherein the annular space lies in the range 0.025 mm to 0.25 m.

* * * * *